(12) United States Patent
McMurtray et al.

(10) Patent No.: US 7,747,499 B2
(45) Date of Patent: Jun. 29, 2010

(54) STRUCTURE FOR GENERATING A SOURCE OF CONTINGENT CAPITAL

(75) Inventors: Nathan McMurtray, New York, NY (US); Khalid Azim, Rye, NY (US)

(73) Assignee: Morgan Stanley, New York, NY (US)

( * ) Notice: Subject to any disclaimer, the term of this patent is extended or adjusted under 35 U.S.C. 154(b) by 1641 days.

(21) Appl. No.: 10/960,460

(22) Filed: Oct. 7, 2004

(65) Prior Publication Data

US 2006/0080193 A1 Apr. 13, 2006

(51) Int. Cl.
*G06Q 40/00* (2006.01)

(52) U.S. Cl. .................. 705/36 R; 705/37; 705/38; 705/39

(58) Field of Classification Search ............... 705/36 R, 705/37–39
See application file for complete search history.

(56) References Cited

U.S. PATENT DOCUMENTS

2003/0014343 A1* 1/2003 Jones ..................... 705/36

OTHER PUBLICATIONS

"Auction Market Securities," Merrill Lynch, Pierce, Fenner & Smith Inc., 2003.

* cited by examiner

*Primary Examiner*—Daniel S Felten
(74) *Attorney, Agent, or Firm*—K&L Gates LLP

(57) ABSTRACT

Embodiments of the present invention are directed to a financing structure for generating a source of contingent capital for a company. According to various embodiments, the company enters into a put option agreement with an entity, such as a trust. The put option agreement permits the company to put preferred stock of the company to the trust. The company also enters into a warrant agreement with the trust. The warrant agreement permits the trust to buy equity securities (such as common stock) of the company or a corporate entity related to the company (e.g., a holding company) from the company. The trust issues to investors bifurcated convertible instruments. The instruments include a fixed income instrument and a warrant to purchase equity securities of the related corporate entity (e.g., the holding company). With the proceeds from the offering, the trust purchases eligible assets, such as low risk government securities which pay fixed or floating periodic interest or dividend payments. The interest rate or dividend rate on the fixed income instrument issued by the trust may match the yield on the eligible assets. The operating company's ability to put its preferred stock to the trust in exchange for the put option strike price payment provides the operating company and/or the holding company with the source of contingent (or soft) capital.

14 Claims, 8 Drawing Sheets

STRUCTURE FOR GENERATING A SOURCE OF CONTINGENT CAPITAL

BACKGROUND

Some companies, particularly monoline insurance companies (i.e., insurers that insure against one type of risk), seek to maintain a large contingent source of capital (sometimes referred to as "soft capital") in order to maintain or achieve a high credit rating from credit rating agencies. The large contingent source of capital provides assurance that adverse events (such as a catastrophe leading to higher or increased claims for an insurer) would not impair the company's ability to meet its obligations. Especially for highly leveraged companies that depend on continuous efficient access to the capital markets, such as monoline insurance companies, maintaining elevated credit ratings is critical. However, to maximize return on assets and profitability, companies typically do not want such contingent capital sources to be on their balance sheets until needed. To achieve their goals, companies have obtained standby letters of credit from banks or have issued auction-rate preferred securities.

FIG. 1 is a diagram of a financing involving auction-rate preferred securities. In this structure, an operating company 10 establishes a trust 12. The trust 12 issues the auction-rate preferred securities 13 to investors 14. Auction-rate preferred (ARP) securities are fixed-income instruments (such as trust preferred securities) that pay a periodic payment (e.g., a dividend or coupon) to the holders thereof. ARP securities are typically priced in a Dutch auction by prospective investors. The rate of the payment is reset each auction, which is typically every twenty-eight days, to reflect changes in market conditions. With the proceeds from the offering of the ARP securities, the trust 12 purchases eligible assets 16, which are typically thirty-day commercial paper and/or short-term government securities.

In addition, so as to reduce interest rate risk and ensure access to the full amount of the assets, the trust 12 enters into an asset swap agreement with an asset swap counterparty 17. Under the asset swap agreement, the trust 12 pays the asset swap counterparty 17 interest paid on the eligible assets 16, and the asset swap counterparty 17 makes investment decisions relating to the eligible assets 16 and pays a floating rate payment to the trust 12 that is related to a published index rate, such as LIBOR. The asset swap counterparty 17 also guarantees that the par value will be received on termination.

Because the eligible assets 16 are short-term, the trust 12 must obtain new eligible assets periodically (e.g., every thirty days). Because the yield on the eligible assets 16 may fluctuate from one period to the next, the payment rate on the ARP securities 13 must also be periodically adjusted.

The trust 12 also enters into a put option with the operating company 10. Under the put option, the operating company 10, at its option, may require the trust 12 to purchase shares of stock in the operating company 10. Typically the shares are perpetual preferred stock. The purchase price is the par value of the eligible assets 16. In exchange for this right, the operating company 10 pays a put premium (typically periodically) to the trust 12. The trust 12 uses the proceeds from the put premium and the floating rate payments from the asset swap counterparty 17 to make the payments on the ARP securities 13 to the investors 14.

Further, the put right may also be exercised by an affiliate company 18 (typically a subsidiary) of the operating company 10 exercising an unconditional right to withdraw the eligible assets 16 in exchange for delivering shares of perpetual preferred stock of the operating company 10 to the trust 12. In the event that the market value of the eligible assets 16 is less than their original value at inception (sometime referred to as "par value" herein), the trust 12 also receives a termination payment from the asset swap counterparty 17 for the difference and the trust 12 forwards that payment to the affiliate company 18 (the trust 12 makes such a payment to the asset swap counterparty 17 if the market value exceeds par value). This constitutes the contingent source of capital (soft capital) for the company. The affiliate company 18 may withdraw the assets to pay large claims in the event of a catastrophe, for example. Because the affiliate company 18 has unconditional access to the full par value of the eligible assets 16, credit rating agencies will typically consider the operating company 10 and the affiliate company 18 to own the assets for credit purposes. In such an arrangement, however, the investors 14 face the potential risk (though typically very small) that the operating company 10 or the affiliate company 18 will withdraw some or all of the eligible assets 16 and replace them with perpetual preference shares of the operating company 10.

There are drawbacks for companies that use this financing structure. For example, the ARP securities 13 have to be auctioned to prospective investors periodically (e.g., every 28 days). If there is low investor demand for such securities, the interest rate necessary to sell a sufficient amount of the securities may be high, requiring a large put premium from the operating company 10 to make up the difference. This may reduce the attractiveness of the ARP securities-based contingent capital arrangement. Stand-by letters of credit are also becoming increasingly difficult to obtain.

SUMMARY

In one general aspect, the present invention is directed to a financing structure for generating a source of contingent capital for a company. The company may be, for example, the operating company of an insurance provider, such as a monoline insurer. According to various embodiments of the financing structure, the operating company enters into a put option agreement with an entity, such as a trust. The put option agreement permits the operating company to put perpetual preferred stock of the operating company to the trust in exchange for a put option strike price payment. The terms of the put option, its economic effect and the legal documentation embodied in the put option agreement may be determined, developed, drafted and/or modeled using one or more computer systems. The operating company also enters into a warrant agreement with the trust. The warrant agreement may permit the trust to buy equity securities (such as common stock) of the operating company or a corporate entity related thereto from the operating company in exchange for a warrant strike price payment. The related corporate entity may be, for example, a holding company of the insurance provider. The terms of the warrant, its economic effect and the legal documentation embodied in the warrant agreement may be determined, developed, drafted and/or modeled using one or more computer systems.

In addition, the trust may issue to investors bifurcated convertible instruments. The bifurcated convertible instruments include a fixed income instrument and a warrant to purchase equity securities of the related corporate entity (e.g., the holding company). The fixed income instruments may be, for example, trust-preferred securities. With the proceeds from the offering, the trust purchases eligible assets, such as low risk government or corporate securities which pay fixed or floating periodic interest or dividend payments. The interest rate or dividend rate on the fixed income instrument issued by the trust as part of the convertible instrument may match the yield earned on the eligible assets. Alternatively, the trust may enter into an agreement with a third party to manage the eligible assets and guarantee a specific fixed or floating rate of return plus par value on demand. The terms of the bifurcated convertible securities, their separate components, and the mechanisms by which a third party manages the eligible assets, along with the economic effect and the legal documentation for each of these may be determined, developed, drafted and/or modeled using one or more computer systems.

The operating company's ability to put its preferred stock to the trust in exchange for the put option strike price payment provides the operating company with the source of contingent (or soft) capital. The decision to exercise this put option may be made or modeled using a computer system. Moreover, a computer system may be used to transmit notification of the option exercise to relevant parties. When the operating company exercises the put option, the trust may liquidate the eligible assets to pay the put option strike price payment to the operating company. These valuations of the eligible assets for purposes of liquidation may be carried out using a computer system, as may the actual execution of trades necessary to liquidate the eligible assets. In addition the trading strategy used to liquidate the assets may be determined through computer modeling (to determine timing, price levels and amounts and similar key parameters depending on the specific nature of the eligible assets) to maximize the return achieved. The trust may then use the dividend payments on the preferred stock from the operating company to pay the periodic interest or dividend payments on the fixed income instruments issued to the investors as part of the bifurcated convertible instruments. In some embodiments a computer system is used to calculate the payment amounts and transmit the necessary funds. The trust may also enter into an asset swap agreement with an asset swap counterparty to cover any shortfall in the value of the eligible assets to satisfy the put option strike price payment. Alternatively, the trust may enter into derivative contracts or other agreements to over-collateralize or otherwise ensure par value of the assets upon a put by the operating company. Any of the asset swap agreement, the trading strategy used by the asset swap counterparty, the terms of the derivatives and other agreements and their separate components, along with the economic effect and the legal documentation for each of these may be determined, developed, drafted and/or modeled using one or more computer systems.

The investors may exercise their warrants to purchase common stock of the holding company by tendering the fixed income instruments. This exercise decision may be made by investors based on results from computer simulations or models, as well as hedging and trading strategies modeled on, developed by, or documented using various computer systems. Moreover, the warrant exercise and/or tender of fixed income instruments may be accomplished through the use of various computer and communication systems. Upon an exercise, the trust may exercise its warrant to purchase the common stock of the operating company or the holding company, as applicable, from the operating company to transfer to the investors to satisfy the investors' warrants. According to various embodiments, the holding company may guarantee the warrant obligations of the operating company to deliver the holding company common stock to the trust. The exercise decisions may be made, and guarantee documentation developed with, one or more computer systems.

Such a financing structure provides many benefits in comparison with conventional mechanisms for raising contingent or soft capital, as will be apparent from the description below.

DESCRIPTION OF THE FIGURES

Various embodiments of the present invention are described herein by way of example with reference to the following figures.

DETAILED DESCRIPTION

FIGS. 2-7 illustrate a transaction structure according to various embodiments of the present invention. The transaction structure may be used to generate a source of contingent capital (soft capital) for a company, such as for an insurance company (e.g., a monoline insurer). The company using the transaction structure may comprise a holding company (HoldCo) 30 and at least one operating company (OpCo) 32. In the context of a monoline insurance company, HoldCo 30 may issue common stock ("HoldCo stock") and OpCo 32 may perform a monoline reinsurance operation. OpCo 32 may also issue perpetual preferred stock ("OpCo preferred stock"). All of these securities, the transactions involved and the legal documentation for each of these may be valued, determined, developed, drafted and/or modeled using one or more computer systems. Various embodiments of the present invention are described below in which the company using the structure is an insurance company having separate holding and operating companies 30, 32, although it should be recognized that the structure may be used for other companies that may derive a benefit from the structure or where a single company acts as both HoldCo and OpCo. Where a single company acts as both HoldCo and OpCo, it may issue preferred stock as well as common stock.

Figure 2:
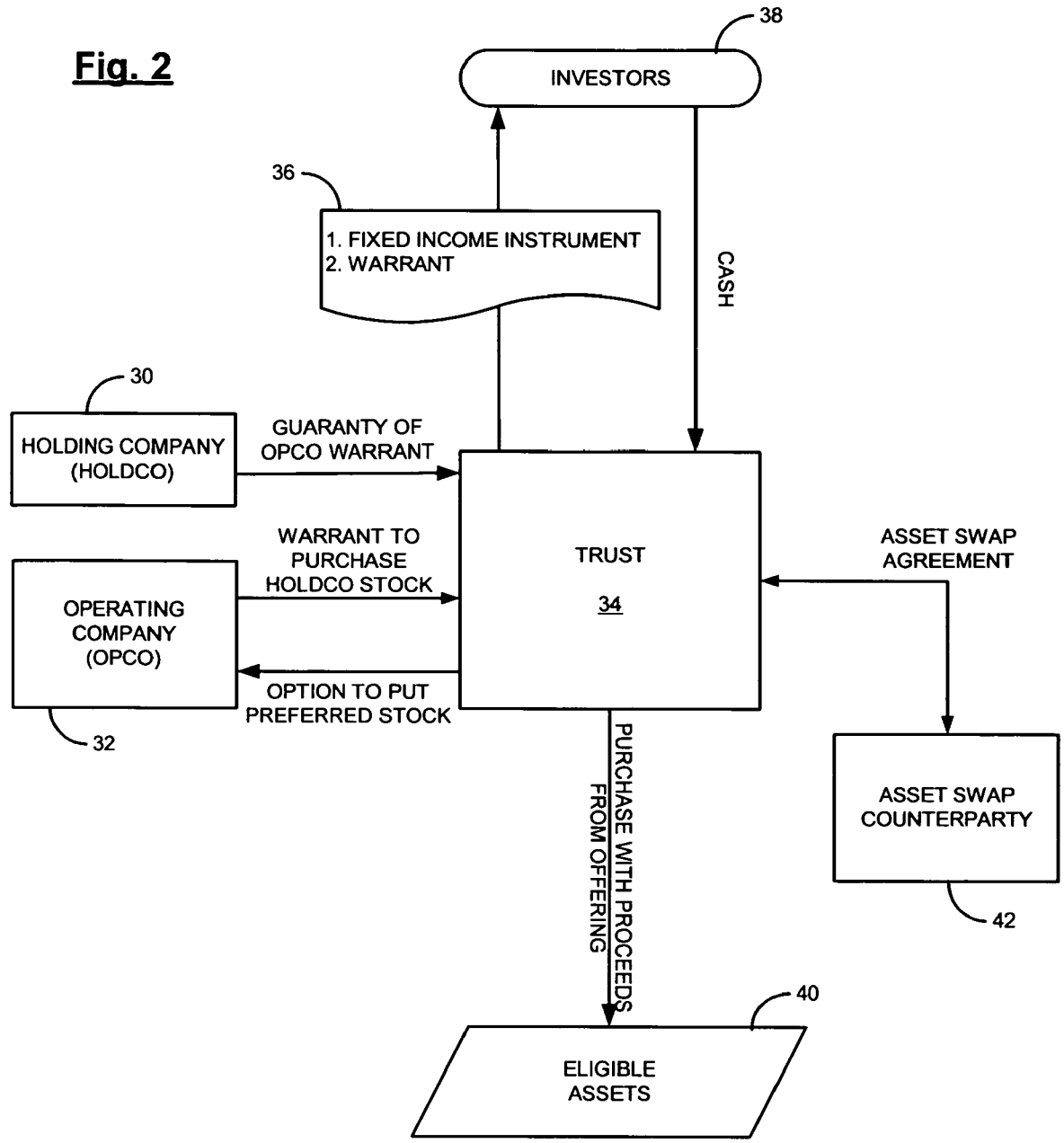
FIGS. 2-7 are diagrams of a financing structure according to various embodiments of the present invention.

Pursuant to various embodiments of the present invention, OpCo 32 establishes or otherwise sets up a trust 34 or other special purpose entity. The trust 34 issues bifurcated convertible instruments 36 to investors 38. FIG. 2 is a diagram of the structure at issuance of the instruments 36. Each bifurcated convertible instrument 36 may include (i) a fixed income instrument and (ii) a warrant to purchase HoldCo stock. These securities and the relevant legal documentation may be valued, determined, developed, drafted and/or modeled using one or more computer systems. The fixed income instruments may be, for example, trust-preferred securities or preferred stock issued by the trust 34. The fixed income instruments may entitle the holders thereof (i.e., the investors 38) to periodic distribution payments (e.g., dividend payments or coupon payments) by the trust 34. As explained below, the investors 38 may exercise the warrants to purchase the HoldCo stock by paying the strike price of the warrants by tendering the fixed income instruments to the trust 34. As such, the strike price payment for the warrant may equal the par value of the fixed-income instrument. For this reason, the bifurcated convertible instruments 36 are sometimes referred to hereinafter as "convertible instruments" since they can be converted to HoldCo stock. The constituent components of the convertible instruments 36, according to various embodiments, may be traded separately or may be traded as a packaged unit. It should be noted that the trust 34 may also issue the fixed income instrument and the warrant to purchase HoldCo stock separately. Various computer systems may be used to value, model, price and document the constituent components of the convertible instruments 36, either separately or as packaged units, as well as the fixed income instrument and warrant separately issued by the trust 34.

Figure 1:
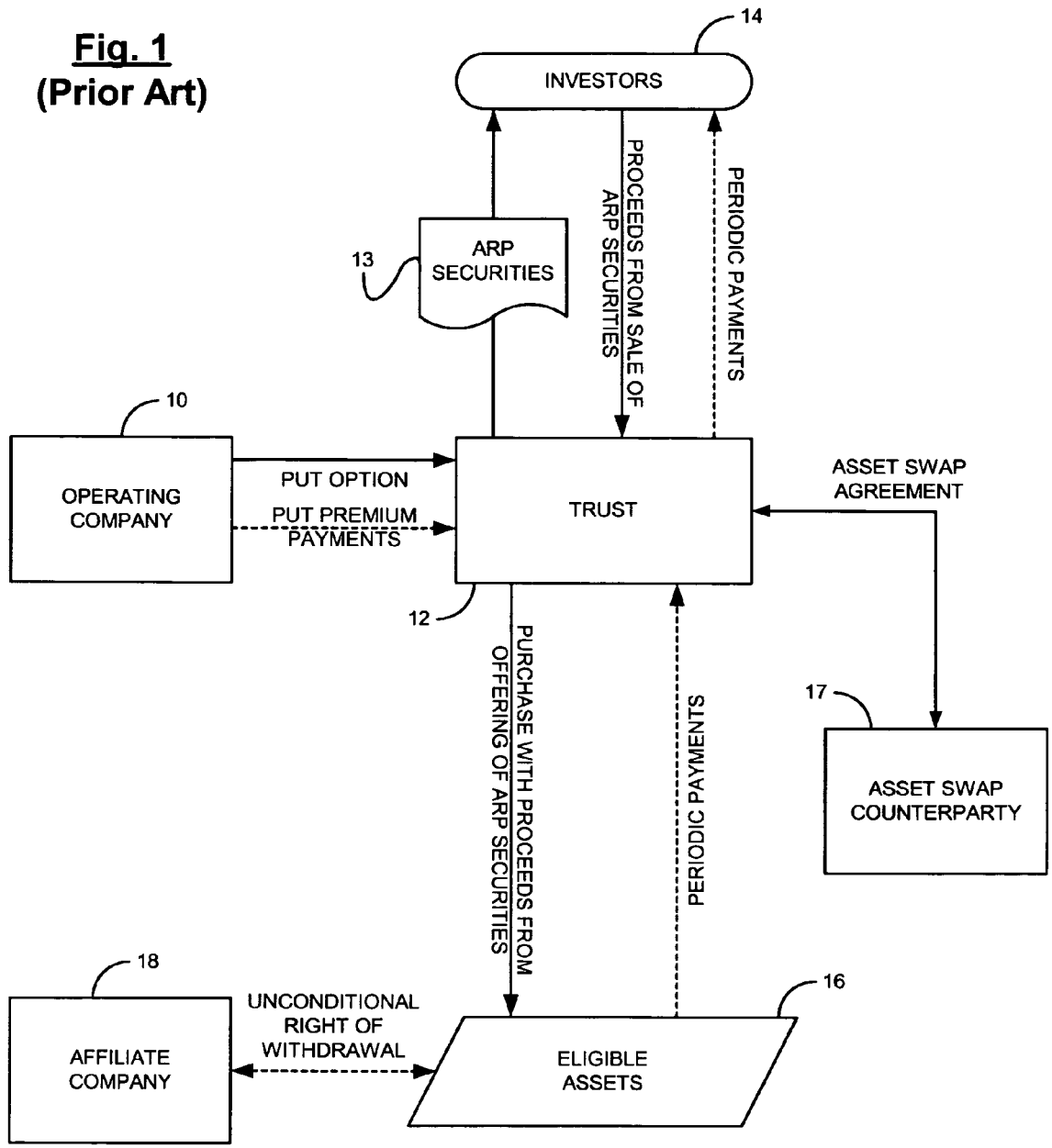
FIG. 1 is a diagram of a prior art auction-rate preferred securities financing structure.

With the proceeds (e.g., cash) from the issuance of the convertible instruments 36, the trust 34 purchases eligible assets 40. The eligible assets 40 may be low risk investments, such as, for example, government securities (e.g., U.S. Treasury notes) or AAA rated corporate bonds. In such embodiments, the eligible assets 40 may pay a fixed or floating periodic income amount to the trust 34 for a relatively long time period, such as seven to ten years, which is in contrast to the eligible assets used in conventional monoline insurance contingent capital arrangements (typically thirty-day commercial paper), as described above in connection with FIG. 1. Other possible variations on the eligible assets 40 are described below. The selection of the specific eligible assets may be accomplished using a computer system to value, model and/or trade the eligible assets. Moreover, risk minimization and return enhancement may be achieved through computer-based trading and risk management strategies involving the eligible assets.

In order to fulfill its obligations on the warrant delivered to the investors 38 as part of the issued convertible instruments 36, the trust 34 may enter into an agreement with OpCo 32 whereby the trust 34 receives a warrant to purchase HoldCo stock from OpCo 32 at a strike price. Also, according to various embodiments, HoldCo 30 may guarantee to the trust 34 the performance of OpCo's warrant obligations with respect to the HoldCo stock. Either or both of the warrant and the guarantee and the associated legal documentation may be determined, developed, drafted and/or modeled using one or more computer systems.

Additionally, as shown in FIG. 2, OpCo 32 may enter into a put option agreement with the trust 34 whereby OpCo 32 receives an option to put OpCo preferred stock to the trust 34 in exchange for a strike price payment. The OpCo preferred stock may be callable or non-callable, and may be cumulative or non-cumulative. The amount of the strike price payment for both the HoldCo stock warrant and the OpCo preferred stock put option may correspond to the value of the eligible assets 40 at the inception of the structure. The terms, features and economic effects of the put option, and the associated legal documentation (including the put option agreement) may be determined, developed, drafted and/or modeled using one or more computer systems.

In addition, the trust 34 may also enter into an asset swap agreement with an asset swap counterparty 42. The asset swap agreement may stipulate that the asset swap counterparty 42 is to make a payment (the "asset swap agreement termination payment") to the trust 34 upon termination of the asset swap agreement if the value of the eligible assets 40 has diminished from the inception of the structure to the date when the asset swap agreement is terminated, and that the trust 34 is to make the asset swap agreement termination payment to the asset swap counterparty if the value of the eligible assets 40 has increased from inception to termination. The amount of the asset swap payment (in either case) may equal the difference between the original value of the eligible assets 40 and the value when the asset swap agreement is terminated. These calculations of the asset swap payments and the asset valuations necessary to determine these may be made, calculated, determined or modeled using one or more computer systems. Also, the asset swap counterparty may receive a premium for entering into the contract, which premium may be calculated, documented and modeled using one or more computer systems. By contractual provision, the asset swap agreement may stipulate that the asset swap agreement is terminated when either the OpCo preferred stock put option or the HoldCo stock warrant is exercised. If either the OpCo preferred stock put option or the HoldCo stock warrant is exercised, the trust 34 may liquidate the eligible assets 40 in order to pay the corresponding strike price payment to OpCo 32. To minimize risk and maximize return from the liquidation of the eligible assets, one or more computer systems may be used to price, value, model and/or trade the eligible assets before or during the liquidation process. In the event that the value of the eligible assets has diminished from the inception of the structure to the date when the asset swap agreement is terminated, the trust 34 may forward the asset swap agreement termination payment to OpCo 32 so that OpCo 32 can recover the original amount of the eligible assets 40. Conversely, if the value of the eligible assets 40 has increased from inception to the time when the asset swap agreement is terminated, the trust 34 may make the asset swap agreement termination payment to the asset swap counterparty 42. The calculation of these value changes and their resulting effect on the asset swap agreement termination payment may be determined using one or more computer systems.

In this structure, OpCo's ability to put the OpCo preferred stock to the trust 34 in exchange for the strike price payment may act as the source of contingent (or soft) capital for OpCo 32. Thus, when OpCo 32 needs access to a source of capital, it may exercise the put. The trust 34 may obtain the funds to pay the strike price payment by liquidating the eligible assets 40 with the shortfall, if any, coming from the asset swap agreement termination payment. A credit rating agency may credit OpCo 32 and HoldCo 30 with having access to the entire amount of the initial value of the eligible assets 40, or some fraction thereof. However, since OpCo 32 has no liability for such funds until the put is exercised, for accounting purposes the funds do not appear on OpCo's or HoldCo's balance sheet until the put is exercised.

Figure 3:
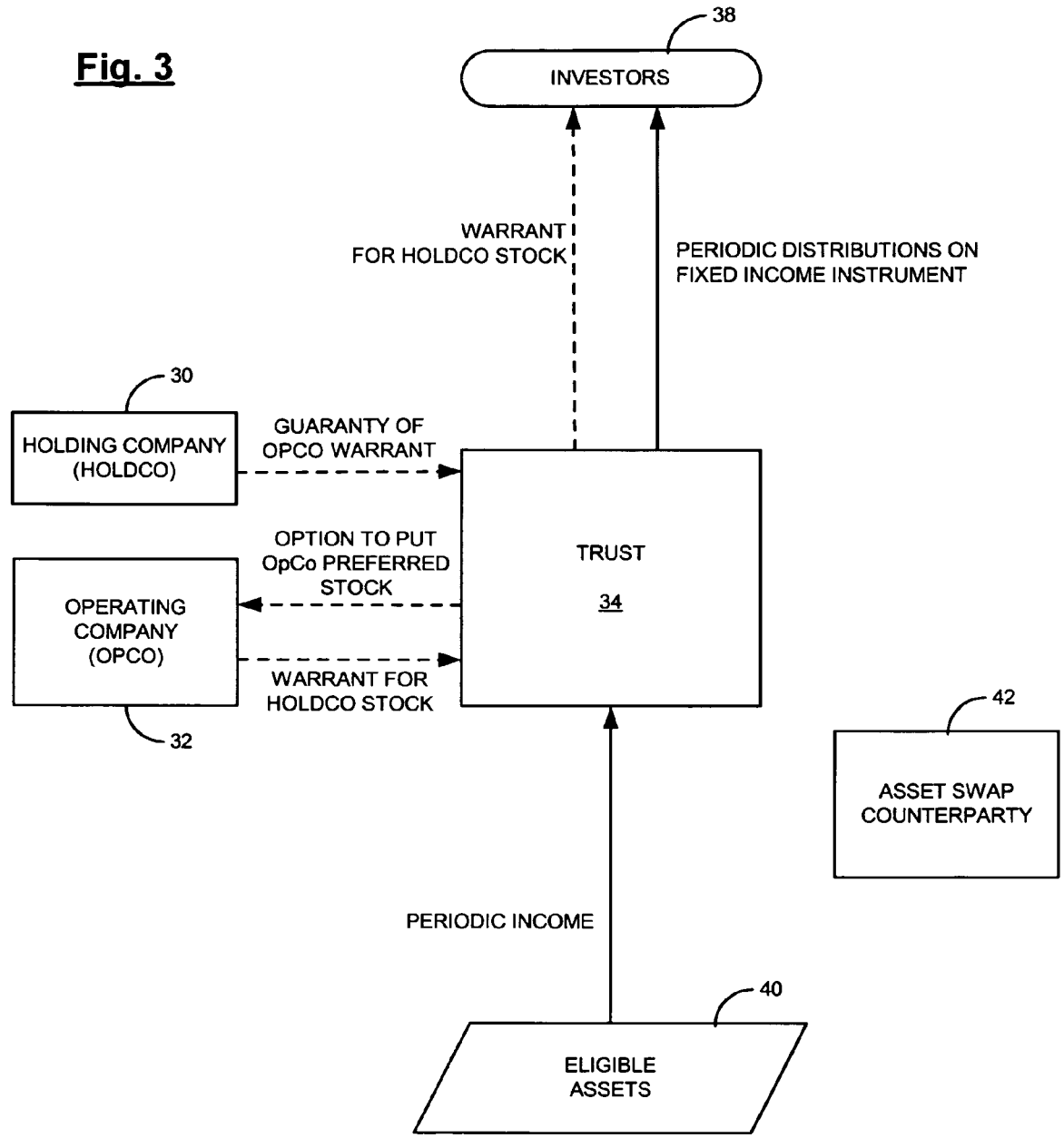

FIG. 3 is a diagram of the ongoing payments made during the term of the fixed income instruments of the convertible instrument 36 pursuant to embodiments of the present invention, assuming neither of the OpCo preferred stock put option nor the HoldCo stock warrant have been exercised. As can be seen in FIG. 3, the trust 34 receives periodic income from the eligible assets 40, such as periodic (e.g., quarterly) interest payments when the eligible assets 40 are government securities. The amount of this income and the selection of eligible assets to minimize risk while generating maximum income may be determined and calculated using one or more computer systems. In turn, the trust 34 pays periodic distribution payments on the fixed income instruments of the convertible instrument 36 to the holders of the fixed income instruments (i.e., the investors 38). According to various embodiments of the present invention, the coupon or dividend rate paid to the investors 38 on the fixed income instruments may correspond to the yield on the eligible assets 40. This may be achieved, for example, by setting the conversion premium (or strike price) on the investors' warrant to purchase HoldCo stock at a level that makes the yield on the fixed income instrument demanded by the investors 38 equal the yield on the eligible assets. Other terms besides the conversion premium of the investors' warrant to purchase HoldCo stock may also be adjusted to make the yield on the fixed income instrument demanded by the investors 38 equal the yield on the eligible assets, such as the maturity, or whether additional warrants for HoldCo stock are included, etc. All such calculations and the combination of terms to achieve the desired economic results may be modeled, calculated or determined using one or more computer systems. Unlike the prior art described in connection with FIG. 1, such embodiments do not require additional payments by OpCo 32 (e.g., put premiums) or even by the asset swap counterparty 42 prior to termination. By using the trust 34 to issue the convertible securities 36, the assets and liabilities of the trust 34 remain separate from OpCo's balance sheet.

Figure 4:
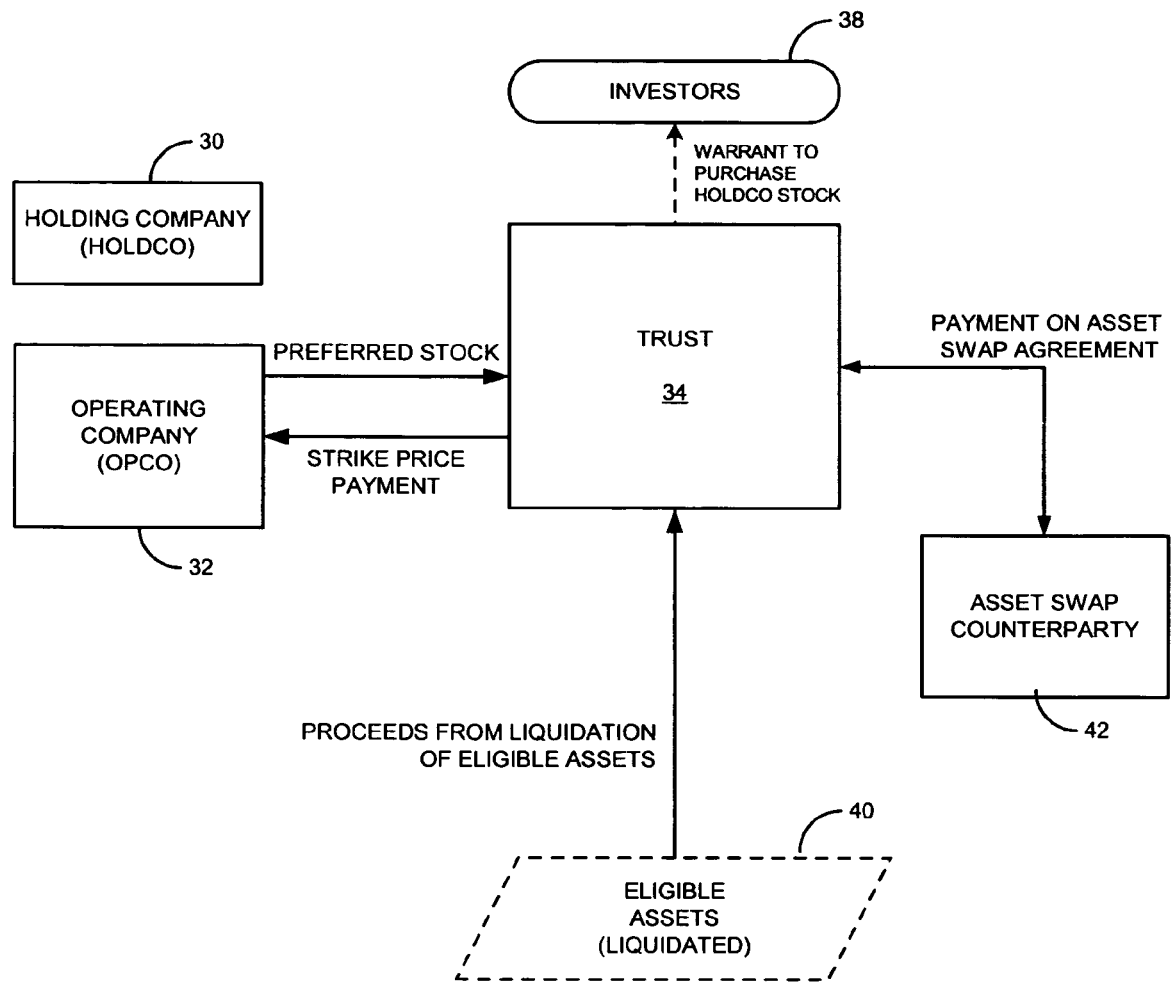

FIG. 4 is a diagram of the structure upon OpCo's exercise of the OpCo preferred stock put option. OpCo 32 may exercise the put option when it needs access to capital, such as, for example, to pay large claims resulting from a catastrophic event when the operating company is an insurer. This exercise decision may be modeled and/or executed using one or more computer systems. As can be seen in FIG. 4, OpCo 32 puts the OpCo preferred stock to the trust 34 in exchange for the strike price payment. The trust 34 may liquidate the eligible assets 40 to pay the strike price payment. If the value of the eligible assets 40 has diminished in the time period from inception to exercise of the put option, the shortfall in the strike price payment may be covered by the asset swap agreement termination payment from the asset swap counterparty 42. Conversely, if the value of the eligible assets 40 has increased during the time period from inception to exercise of the put option, the trust 34 may make an asset swap agreement termination payment to the asset swap counterparty 42. Alternatively, over-collateralization or a payment by a third party may be used to make up the difference or ensure that no shortfall exists. The amount, nature, size and other relevant terms of the over-collateralization may be modeled, calculated and/or determined using one or more computer systems.

Figure 5:
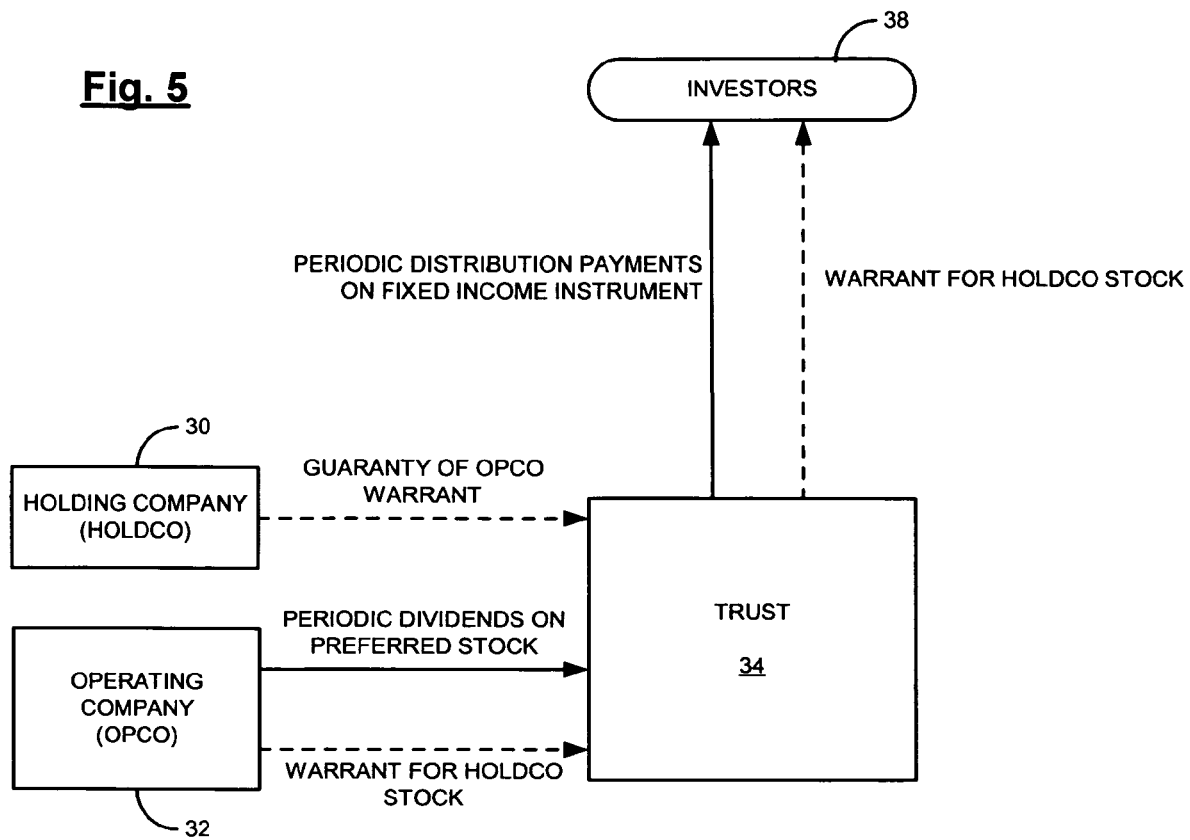

FIG. 5 is a diagram of the ongoing payments under various embodiments of the structure after OpCo's exercise of the OpCo preferred stock put option. As can be seen in FIG. 5, the trust 34, as holder of OpCo's preferred stock through exercise of the put option, receives periodic (e.g., quarterly) dividend payments on the preferred stock from OpCo 32. The trust 34 in turn uses the dividend payments on the OpCo preferred stock to pay the periodic distribution payments to the investors 38 on the fixed income instrument of the convertible instrument 36. All of these payments may be calculated or determined using a computer system. Under these circumstances, the ongoing dividend payments to the trust 34 by OpCo 32 on the OpCo preferred stock may be accounted for in the ordinary manner for preferred stock. At some point after exercise of the put option, such as if the economic position of OpCo 32 improves after the need for the contingent capital, OpCo 32 may call the OpCo preferred stock. The decision to call the OpCo preferred stock may be made based on models, calculations, valuations or with reference to trading prices or strategies determined by or with the use of one or more computer systems.

Figure 6:
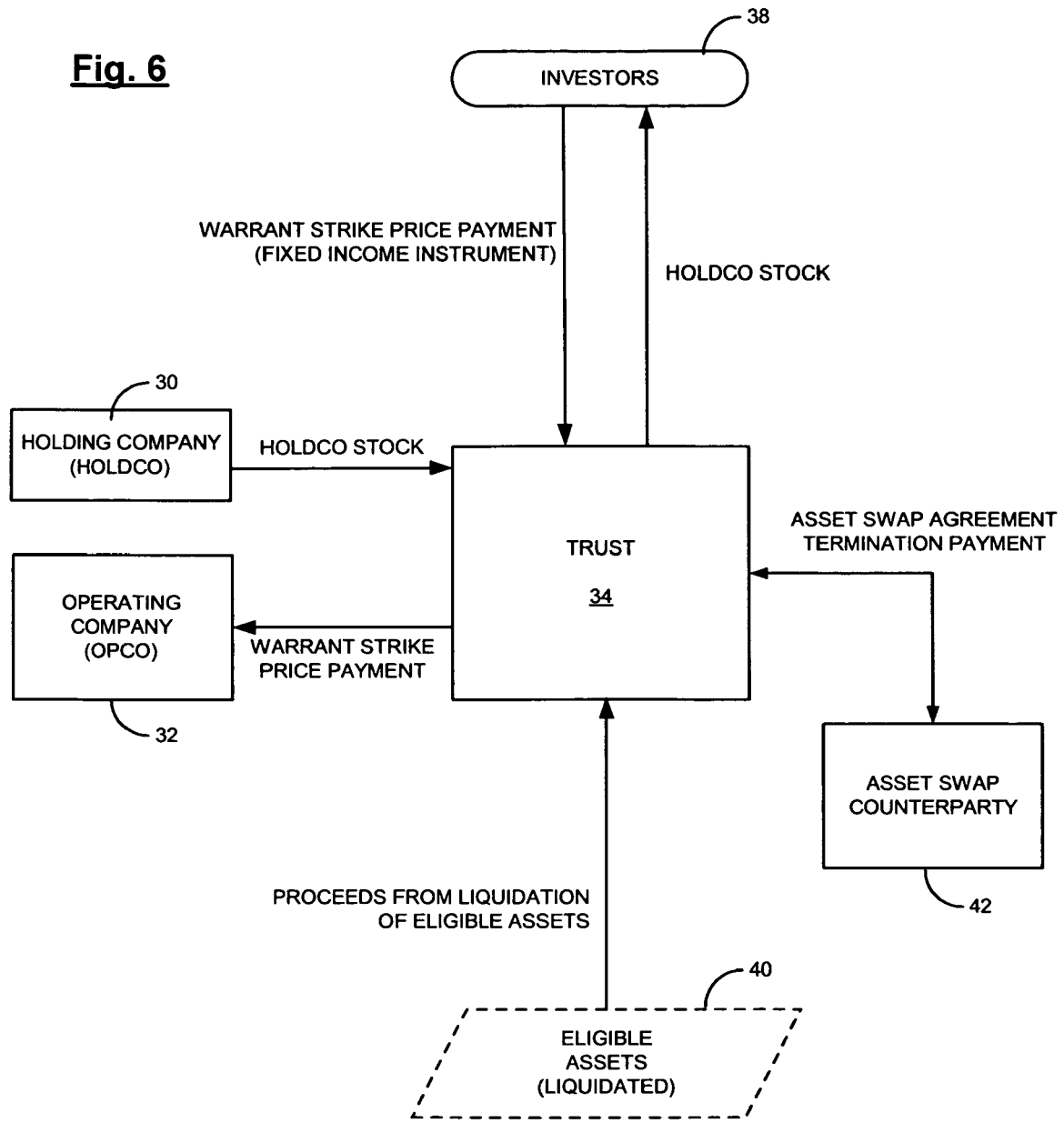

FIG. 6 is a diagram of the transactions upon conversion of the convertible instrument 36 by the investors 38 according to various embodiments of the present invention. As can be seen in FIG. 6, the investors 38 may exercise their warrant to purchase HoldCo stock by tendering the corresponding strike price payment for the warrant to the trust 34 in exchange for the HoldCo stock. The investors 38 may pay the strike price payment with the fixed income instruments of the convertible instrument 36. In order to obtain the HoldCo stock to transfer to the investors 38, the trust 34 may exercise its warrant to purchase HoldCo stock from OpCo 32. As discussed above in connection with FIG. 2, HoldCo 30 may guarantee OpCo's performance of its obligations under the warrant. The exercise of the investors' warrants for HoldCo stock may terminate an applicable portion of the put option between OpCo 32 and the trust 34. That is, for example, the put option between OpCO 32 and the trust 34 may, in essence, comprise many puts—one for each warrant issued to the investors 38. If one investor 38 exercises the warrant, a matching put between OpCo 32 and the trust 34 is terminated; if all of the investors 38 exercise their warrants, all of the puts between OpCo 32 and the trust 34 are terminated. Exercise of the investors' warrants for HoldCo stock may also terminate the asset swap agreement between the trust 34 and the asset swap counterparty 42 in embodiments of the structure where an asset swap agreement is employed. As discussed herein, in some embodiments there may not be an asset swap agreement, such as where the eligible assets 40 are over-collateralized or where a third party agreement is used to make up the difference. The various exercise decisions may be made based on models, calculations, valuations or with reference to trading prices or strategies determined by or with the use of one or more computer systems.

In order to pay the warrant strike price payment to OpCo 32, the trust 34 may liquidate the eligible assets 40. As discussed above in connection with FIG. 2, in embodiments where there is an asset swap agreement, if the value of the eligible assets 40 has diminished in the time period from inception to exercise of the warrant, the shortfall in the warrant strike price payment may be covered by the asset swap agreement termination payment from the asset swap counterparty 42. Conversely, if the value of the eligible assets 40 has increased during the time period from inception to exercise of the put option, the trust 34 may make an asset swap agreement termination payment to the asset swap counterparty 42. According to embodiments where there is no asset swap agreement, the shortfall (if any) may be covered by over-collateralization of the eligible assets 40 or by a payment from a third party.

The following points should be observed about the financing structure described above. First, as can be seen in FIG. 3, various embodiments of the financing structure can be self-funding; that is, the income on the eligible assets 40 can be used to pay the distribution payments on the fixed income instruments issued to the investors 38 as part of the bifurcated convertible instrument 36. This is in contrast to conventional auction-rate preferred securities contingent capital financing structures, as described above in connection with FIG. 1, where the entity issuing the ARP securities (e.g., the trust 12 in FIG. 1) must use both the income from the eligible assets and the put premium payments to make the payments on the ARP securities. The calculations, valuations and selection of appropriate terms to achieve a self-funding transaction structure that is simultaneously attractive to investors is complex and may be made using one or more computer systems. Second, auction-rate preferred securities are not needed with embodiments of the present invention to generate the source of contingent capital. Rather, according to various embodiments, the eligible assets 40 can be low risk government or corporate securities with a relatively long maturity, thus obviating the need to reset the interest rate of the securities issued by the trust 34, as is the case with the ARP securities-based arrangement. Also, according to various embodiments of the present invention, as described above, the conversion premium on the warrant to purchase HoldCo stock issued to the investors 38 as part of the bifurcated convertible instrument 36 can be adjusted so that the interest rate demanded by the investors 38 on the fixed income instruments matches the interest rate on the eligible assets 40. Thus, the trust 34 need not accumulate excess cash. The precise conversion premium necessary will vary based on specific terms of the bifurcated convertible instrument and prevailing or expected market conditions, and one or more computer systems may be used to model, price, value and/or make the calculations necessary to determine the correct conversion premium in light of the applicable circumstances.

Figure 7:
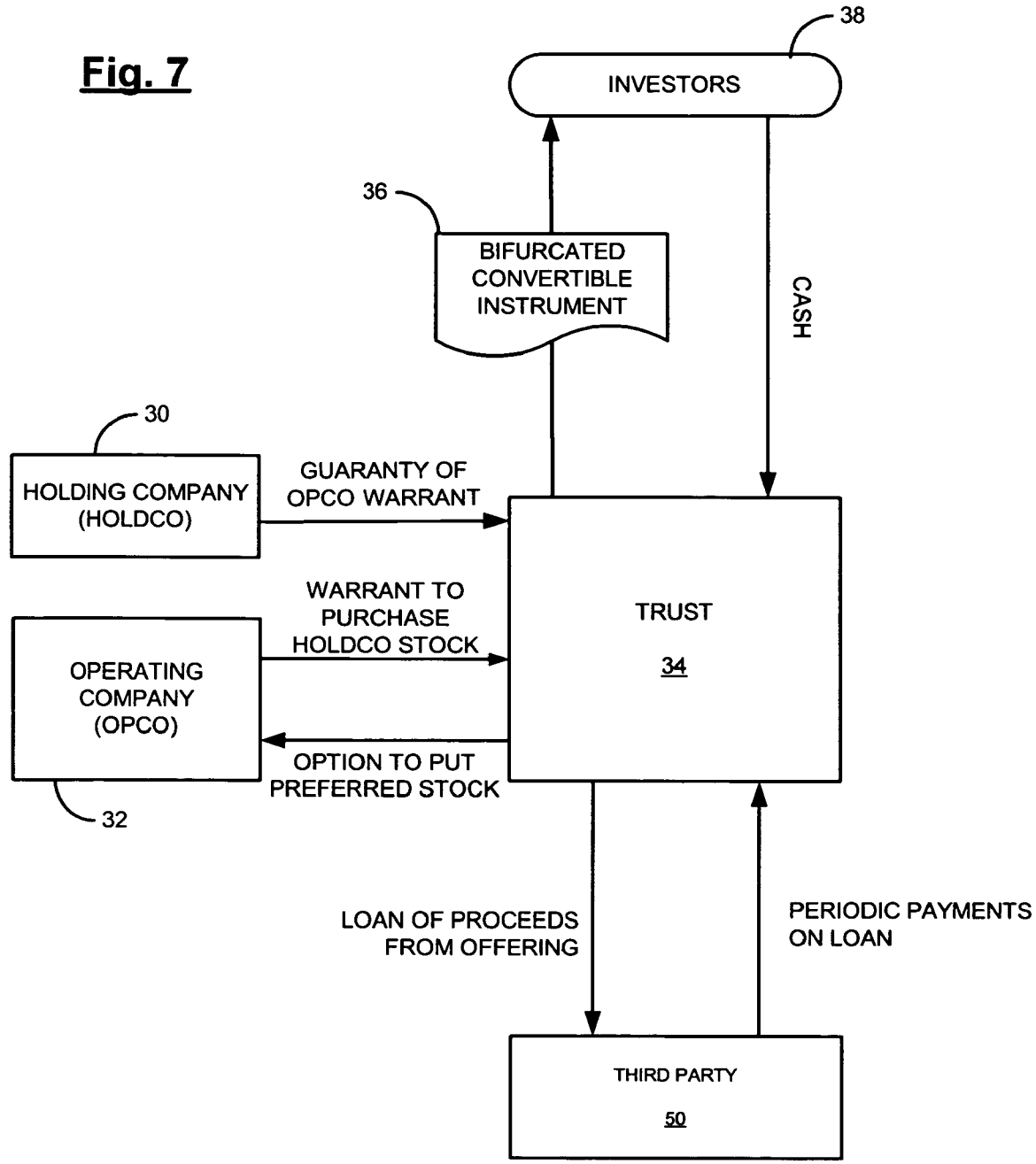

As described above, the eligible assets 40 may be low risk government or corporate securities and the trust 34 may enter into the asset swap agreement to cover any shortfall in the value of the eligible assets 40 when the OpCo preferred stock put or HoldCo stock warrant is exercised. According to other embodiments, as shown in FIG. 7, the trust 34, pursuant to an agreement, may loan the proceeds from the offering to a third party 50, preferably a third party having a high credit rating, such as AAA. In such a structure, the third party 50 may be able to earn a higher yield on the proceeds than the interest rate demanded by the investors 38. As such, the third party 50 may make periodic payments to the trust 34 sufficient to cover the distribution payments on the convertible instruments 36, and the third party 50 may keep any excess proceeds for itself. The agreement may further stipulate that the trust 34 can recall the par value of the eligible assets at any time. No asset swap agreement is needed for such a structure. The amount, frequency and other terms of the payments made by the third party 50 may be determined, modeled or calculated using one or more computer systems.

According to yet another embodiment, the trust 34 may purchase collateralized loan obligations (CLOs) issued by an entity, such as a bank. The CLOs may be over-collateralized to an extent such that there is sufficient certainty (in the view of credit rating agencies, for example) that the trust 34 can liquidate the CLOs for at least the desired level of contingent capital. For example, if a company desires to generate $100 million of contingent capital, it may purchase CLOs having a par value of $150 million as the eligible assets (paid for by raising $150 million in proceeds from the investors 38). The $50 million cushion may ensure that the CLOs can likely be liquidated at a later time for at least $100 million. The specific amount of over-collateralization may be determined with reference to computer-based models and forecasts developed using one or more computer systems. Again, with this structure there is no need for an asset swap agreement. According to yet other embodiments, the eligible assets 40 may include more risky investments, such as single A or better rated bonds. In that case the eligible assets 40 may be similarly over-collateralized to an extent that there is sufficient certainty that the trust 34 can liquidate the assets for at least the desired level of contingent capital. Also, the trust 34 may use a combination of these options as the eligible assets. The precise combination of different types of assets may be determined and/or modeled using one or more computer systems and computer-based risk management or trading strategies. Finally, the company seeking to raise the contingent capital may decide to use a structure entirely lacking protection in the event that the put is exercised at a time when the par value of the eligible assets 40 cannot be realized in liquidation; in this case the company would simply receive less credit for soft capital from the rating agencies.

Figure 8:
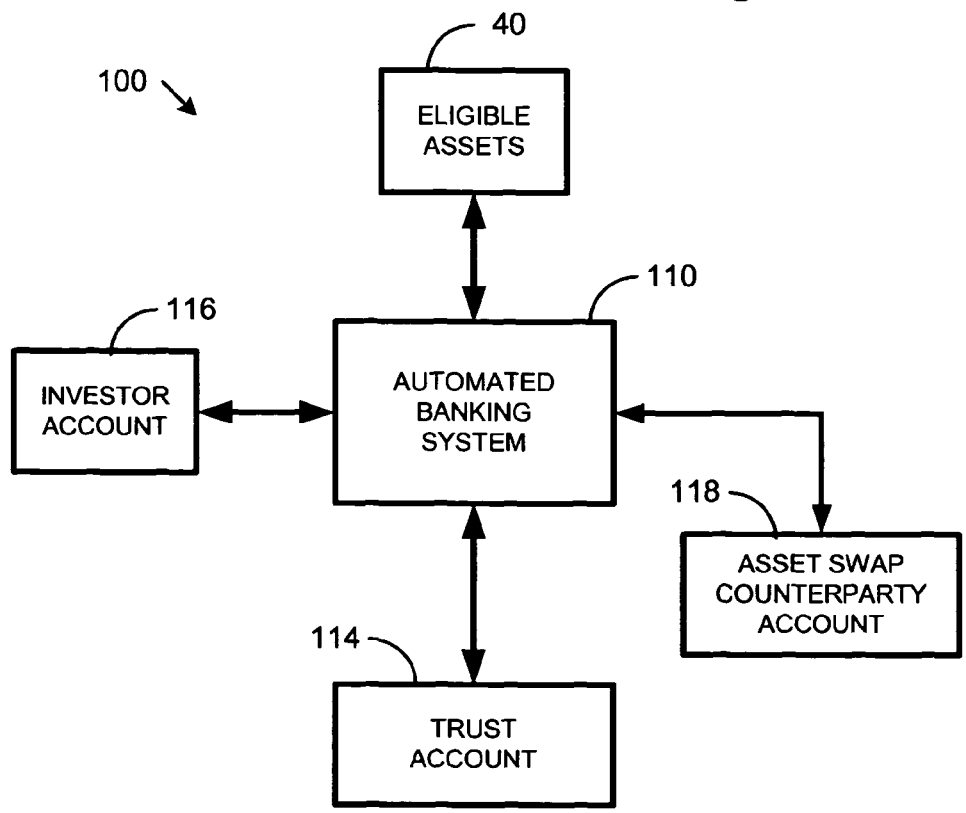
FIG. 8 is a diagram of a system according to various embodiments of the present invention.

FIG. 8 is a diagram of a system 100 according to various embodiments of the present invention. The system 100 may include an automated banking system 110. The automated banking system 110 may be used, for example, to electronically transfer earnings on the eligible assets 40 to a trust account 114, and from the trust account 114 to accounts 116 of the investors 38, such as from payment of the interest on the fixed income instruments of the bifurcated convertible instruments 36. Similarly, the automated banking system 110 may transfer funds between the trust account 114 and an account 118 of the asset swap counterparty 42 pursuant to the asset swap counterparty.

Various embodiments of the present invention are also directed to arranging the above-described contingent soft capital structures and offering the bifurcated convertible instruments.

Figure 9:
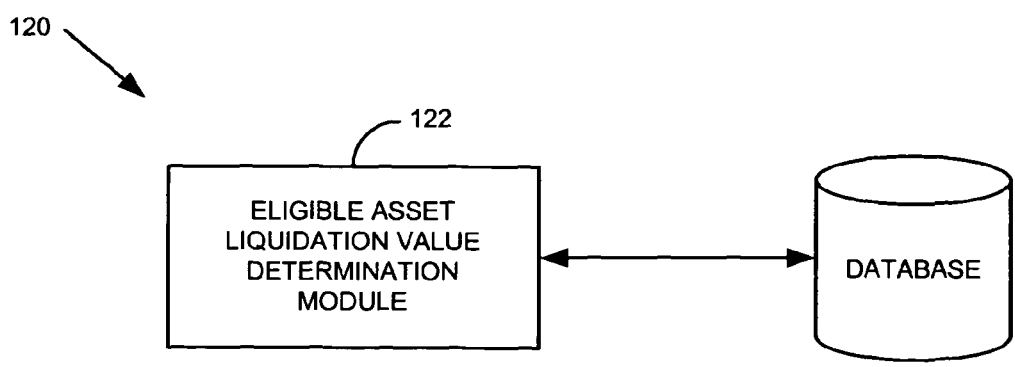
FIG. 9 is a diagram of a computer system according to various embodiments of the present invention.

FIG. 9 is a diagram of a computer system 120 according to another embodiments of the present invention. The computer system 120 may be implemented as one or a number of networked computer devices, and may include an eligible assets liquidation value determination module 122. The module 122 may be implemented as software code to be executed by a processor (not shown) of the computing system 120 using any suitable computer language, such as, for example, Java, C, C++, Virtual Basic or Perl using, for example, conventional or object-oriented techniques. The software code may be stored as a series of instructions or commands on a computer-readable medium, such as a random access memory (RAM), a read-only memory (ROM), a magnetic medium such as a hard drive or a floppy disk, or an optical medium, such as a CD-ROM or DVD-ROM. The eligible assets liquidation value determination module 122 may periodically, such as the end of each trading day, calculate the value of the eligible assets 40 based on market price data for the eligible assets stored in a database 124. The market price data in the database 124 may be updated periodically, such as at the close of each trading day. In that way, the up-to-date value of the eligible assets 40 may be known in case they need to be liquidated.

While several embodiments of the invention have been described, it should be apparent, however, that various modifications, alterations and adaptations to those embodiments may occur to persons skilled in the art. For example, the trust 34 may issue the convertible securities 36 and make the periodic distribution payments thereon via one or more intermediary entities, such as one or more pass-through trusts. Also, the trust 34 may purchase the eligible assets 40 and receive the income on the eligible assets through one or more intermediary entities, such as one or more trusts. The various trusts may or may not be registered under the Investment Advisers Act of 1940. Also, in addition to or instead of government or corporate securities, the eligible assets 40 may comprise securities issued by a trust, partnership or other entity. It is therefore intended to cover all such modifications, alterations and adaptations without departing from the scope and spirit of the present invention as defined by the appended claims.

What is claimed is:

1. A computer-implemented method for facilitating the generation of a source of contingent capital for a company, the method comprising:

modeling, with a computer system comprising one or more computers, economic effects of a put option agreement entered into by an entity with the company, wherein the put option agreement permits the company to put preferred stock of the company to the entity in exchange for a put option strike price payment;

modeling, with the computer system, economic effects of a warrant agreement entered into by the entity with the company, wherein the warrant agreement permits the entity to buy equity securities of a corporate entity related to the company from the company in exchange for a warrant strike price payment; and periodically calculating, with the computer system, a value of eligible assets purchased by the entity with proceeds from the issuance by the entity of instruments to investors, wherein the instruments include:

a fixed income instrument; and a warrant to purchase equity securities of the related corporate entity;

and wherein at least one computer of the computer system comprises a processor and a memory that stores software code to be executed by the processor.

2. The method of claim 1, further comprising the related corporate entity guaranteeing the company's obligations to deliver the equity securities of the related corporate entity pursuant to the warrant agreement.

3. The method of claim 1, further comprising:

the entity entering into an asset swap agreement with an asset swap counterparty; and calculating, by the computer system, amounts of asset swap payments due under the asset swap agreement.

4. The method of claim 1, wherein the payment rate on the fixed income instrument matches the yield on the eligible assets.

5. The method of claim 1, wherein the company is an operating company and the related corporate entity is a holding company.

6. The method of claim 1, wherein the entity issuing the instruments includes a trust.

7. The method of claim 1, wherein the fixed income instrument and the warrant are issued in combination as a convertible instrument by the entity.

8. The method of claim 1, wherein the fixed income instrument includes a trust-preferred security.

9. The method of claim 1, wherein the eligible assets include government securities.

10. The method of claim 1, wherein the eligible assets include securities issued by at least one of a corporation, a trust and a partnership.

11. The method of claim 1, wherein the eligible assets include securities having a value greater than the desired level of contingent capital for the company.

12. The invention of claim 11, wherein the securities include collateralized loan obligations.

13. A computer-implemented method for facilitating the generation of a source of contingent capital for a company, the method comprising:

modeling, with a computer system comprising one or more computers, economic effects of a put option agreement entered into by an entity with the company, wherein the put option agreement permits the company to put preferred stock of the company to the entity in exchange for a put option strike price payment;

modeling, with the computer system, economic effects of a warrant agreement entered into by the entity with the company, wherein the warrant agreement permits the entity to buy equity securities of the company from the company in exchange for a warrant strike price payment; and periodically calculating, with the computer system, a value of eligible assets purchased by the entity with proceeds from the issuance by the entity of instruments to investors, wherein the instruments issued by the entity comprise:

a fixed income instrument; and a warrant to purchase common stock of the company and wherein at least one computer of the computer system comprises a processor and a memory that stores software code to be executed by the processor.

14. The method of claim 1, wherein the value of the eligible assets is calculated by the computer system based upon market price data for the eligible assets stored in a database.

* * * * *